(12) United States Patent
Kubertschak

(10) Patent No.: US 11,588,527 B2
(45) Date of Patent: Feb. 21, 2023

(54) METHOD OF OPERATION FOR AN ANTENNA ARRAY OF A VEHICLE

(71) Applicant: AUDI AG, Ingolstadt (DE)

(72) Inventor: Tim Kubertschak, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/279,814

(22) PCT Filed: Aug. 23, 2019

(86) PCT No.: PCT/EP2019/072569
§ 371 (c)(1),
(2) Date: Mar. 25, 2021

(87) PCT Pub. No.: WO2020/064236
PCT Pub. Date: Apr. 2, 2020

(65) Prior Publication Data
US 2021/0336671 A1   Oct. 28, 2021

(30) Foreign Application Priority Data

Sep. 26, 2018 (DE) .................. 10 2018 216 389

(51) Int. Cl.
*H04B 7/06* (2006.01)
*H04B 17/318* (2015.01)
*G01S 5/00* (2006.01)
*G01S 5/02* (2010.01)

(52) U.S. Cl.
CPC .......... *H04B 7/0617* (2013.01); *G01S 5/011* (2020.05); *G01S 5/0244* (2020.05); *H04B 17/318* (2015.01)

(58) Field of Classification Search
CPC ..... H04B 7/0617; H04B 17/318; G01S 5/011; G01S 5/0244
USPC ....................................................... 375/267
See application file for complete search history.

(56) References Cited

U.S. PATENT DOCUMENTS

| 8,032,134 | B2 | 10/2011 | Tung |
| 2004/0063430 | A1 | 4/2004 | Cave et al. |
| 2017/0223749 | A1 | 8/2017 | Sheldon et al. |
| 2018/0213414 | A1* | 7/2018 | Be .................. H04W 4/40 |

(Continued)

FOREIGN PATENT DOCUMENTS

| DE | 102007029952 A1 * | 1/2009 | ........... H01Q 1/3275 |
| DE | 102007029952 A1 | 1/2009 | |
| WO | WO 2005/031917 A2 | 4/2005 | |

OTHER PUBLICATIONS

International Preliminary Report on Patentability directed to related International Patent Application No. PCT/EP2019/072569, completed Feb. 27, 2020, with attached English-language translation; 15 pages.

(Continued)

*Primary Examiner* — Fitwi Y Hailegiorgis
(74) *Attorney, Agent, or Firm* — Sterne, Kessler, Goldstein & Fox P.L.L.C.

(57) ABSTRACT

A method for operating a plurality of antennas of a vehicle is disclosed, in which the vehicle communicates wirelessly with an external radio station while traveling through a radio cell of the external radio station by means of a radio signal emitted by the plurality of antennas. The vehicle includes a plurality of antennas and a controller operatively connected to the antennas.

18 Claims, 3 Drawing Sheets

(56) References Cited

U.S. PATENT DOCUMENTS

2019/0123433 A1* 4/2019 Lee ..................... H01Q 1/3233

OTHER PUBLICATIONS

International Search Report and Written Opinion of the International Searching Aulhority directed to related International Patent Application No. PCT/EP2019/072569, dated Nov. 15, 2019, with attached English-language translation; 26 pages.
Garcia, Nil et al., "Location-Aided mm-Wave Channel Estimation for Vehicular Communication," 2016 IEEE 17th International Workshop on Signal Processing Advances in Wireless Communications, IEEE, Jul. 3, 2016; 5 pages.

* cited by examiner

METHOD OF OPERATION FOR AN ANTENNA ARRAY OF A VEHICLE

TECHNICAL FIELD

The present disclosure relates to a method for operating a plurality of antennas of a vehicle, in which the vehicle communicates wirelessly with an external radio station while traveling through a radio cell of the external radio station by means of a radio signal emitted by the multiple antennas. The present disclosure also relates to a vehicle having a plurality of antennas and to a controller operatively connected to the antennas.

BACKGROUND

Modern vehicles have a high wireless communication requirement, for example via a mobile radio network. The wireless communication of a vehicle is used to exchange different information. Current news and traffic data, music, and video data and data on vehicle management or on cooperation with other vehicles are received or transmitted by the vehicle. For wireless communication, the vehicle includes one or more antennas, by means of which radio signals are emitted and received during wireless communication.

An ideal approximately punctiform antenna transmits and receives radio signals isotropically, i.e., evenly based on a solid angle, and has no preferred direction for sending and receiving a radio signal. A real antenna, on the other hand, has a fixed directional characteristic that is predetermined by the type of antenna, i.e., the signal strength of an emitted or received radio signal varies depending on a direction of emission of the transmitted radio signal or on a direction of incidence of the received radio signal. When the antenna moves relative to an external radio station, wireless communication via the antenna with the external radio station can therefore be impaired due to the relative movement due to fluctuating signal strengths of the radio signals. For example, a maximum data rate of the communication connection decreases with the signal strength.

In a modern vehicle, a plurality of antennas can be installed, which are arranged spaced apart from one another and together form an antenna arrangement of the vehicle. By means of a suitably configured controller provided in the vehicle and operatively connected to the antennas, they can be functionally connected to form a so-called phased array antenna. Such an antenna arrangement is also referred to as an antenna array.

The multiple antennas of the phased array antenna are controlled by the controller in such a way that they each emit a radio signal with a specific relative phase offset. This ensures that the radio signal emitted by the plurality of antennas has a pronounced directional characteristic, i.e., the signal strength is strong in one preferred direction, while it is weak in other directions deviating from the preferred direction. The reverse is also true for receiving a radio signal with a phased array antenna. This control of a phased array antenna is commonly referred to as digital beam forming (DBF).

In other words, an emission power can be concentrated in a preferred direction by means of the phased array antenna, which increases the range of the emitted radio signal and/or the maximum data rate of the communication connection. However, such a directional communication connection can be interrupted while the vehicle is traveling if the vehicle moves, relative to the external radio station, at right angles to an imaginary straight connecting line between the vehicle and the external radio station. Since a movement of the vehicle can be easily modeled while traveling, i.e., when the situation is not chaotic, an interruption of the communication connection can be counteracted by predicting the preferred direction while the vehicle is traveling.

US 2017/223749 A1 discloses a method for wireless communication of a vehicle with an external radio station while the vehicle is traveling. To establish a communication connection, a phased array antenna of the vehicle or the external radio station detects radio signals from different directions and a controller of the vehicle or of the external radio station determines a relative direction of the external radio station or the vehicle as the direction of the different directions in which a signal strength of a received radio signal is at the maximum. The controller controls the antenna arrangement in such a way that a radio signal from the vehicle or the external radio station is emitted in the determined relative direction. To maintain the communication connection while the vehicle is traveling, either the relative direction is continuously determined and the control of the antenna arrangement is adjusted to the determined relative direction and/or the control of the antenna arrangement is adapted to a detected movement of the vehicle.

U.S. Pat. No. 8,032,134 B2 discloses an alternative method for wireless communication of a vehicle with a stationary external radio station while the vehicle is traveling. In the method, a communication system of the vehicle receives absolute position coordinates of the external radio station from a radio network operator or from the external radio station itself and continuously determines its own absolute position coordinates using GPS (global positioning system) and its own orientation by means of GOS (global orientation system). Using the absolute position of the external radio station and its own absolute position and orientation, the communication system calculates a relative position of the base station and, depending on the calculated relative position, sets a directional characteristic for radio signals emitted from the communication system to the external radio station.

For continuous tracking of the preferred direction, i.e., varying the pronounced directional characteristic, when transmitting and receiving radio signals, extensive computing operations are required, which can put a heavy load on the controller of the vehicle. It is therefore also sought to reduce the computational effort for continuous tracking of the preferred direction.

For this purpose, WO 2005/031917 A1 discloses a method for wireless communication between a first vehicle and a second vehicle while both vehicles are traveling. The first vehicle calculates a relative position of the second vehicle as a vector in vehicle coordinates, selects an antenna system of the vehicle depending on the calculated relative position, and, depending on the directional characteristic of the selected antenna system and the calculated relative position of the second vehicle, calculates a required signal strength of a radio signal to be emitted by the antenna system. If the first vehicle communicates wirelessly with a plurality of second vehicles, the respective vectors are managed in a table.

The wireless communication demand that is already high and will increase with future generations of vehicles consumes a large and ever greater amount of electrical energy and consequently reduces the degree of efficiency, i.e., the range of the vehicle. This effect is perceived as particularly disruptive in electric vehicles.

BRIEF DESCRIPTION OF THE DRAWINGS/FIGURES

DETAILED DESCRIPTION

Figure 1:
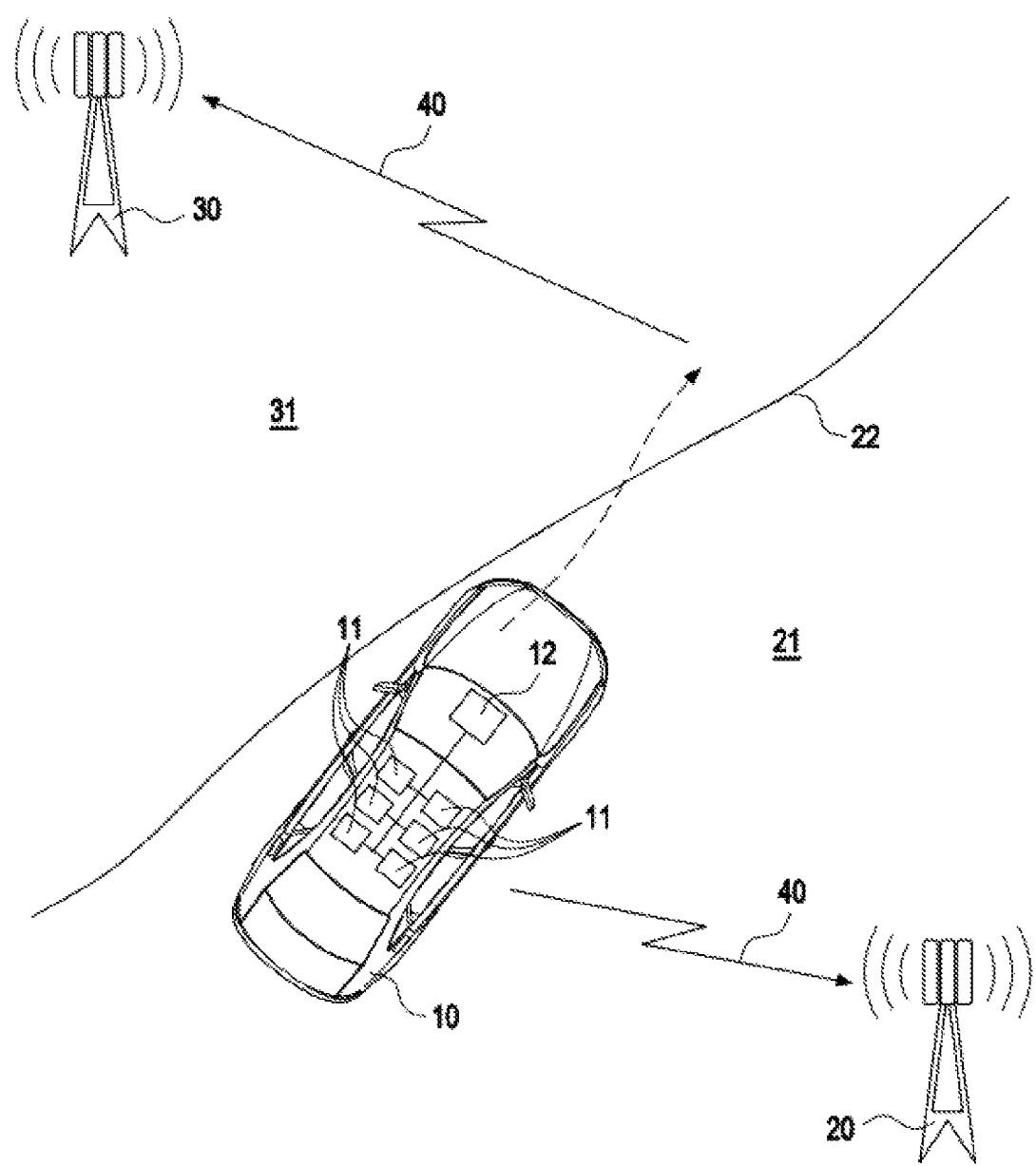
FIG. 1 is a schematic representation of a top view of an embodiment of the vehicle according to some embodiments.

The present disclosure is therefore based on the object of proposing an improved method for operating a plurality of antennas of a vehicle which avoids the disadvantages described and has a low consumption of electrical energy. In addition, it is an object of the present disclosure to provide a vehicle having a plurality of antennas and a controller operatively connected to the antennas.

The subject matter of the present disclosure, in accordance with some embodiments, is a method for operating a plurality of antennas of a vehicle, in which the vehicle communicates wirelessly with an external radio station while traveling through a radio cell of the external radio station by means of a radio signal emitted by the multiple antennas. In modern vehicles, there is a high and, in the future, an increasing demand for wireless communication with external radio stations. The external radio station can be, for example, a base station of a mobile radio network, which generates a mobile radio cell in its environment.

In the method according to some embodiments, a signal strength and/or a directional characteristic of the emitted radio signal is set depending on an accuracy of a determined relative position of the external radio station. By way of a non-limiting example, the wireless communication with the external radio station takes place while the vehicle is traveling with a varying signal strength and/or directional characteristic. The signal strength of the emitted radio signal is varied by varying a transmission power of each of the multiple antennas and has a corresponding direct effect on the energy consumption and thus the degree of efficiency of the vehicle. The degree of efficiency of the vehicle can be increased by suitably varying the transmission power and/or the directional characteristics of the multiple antennas, depending on the accuracy (confidence) of the determined relative position of the external radio station.

In some embodiments, the directional characteristic is strongly pronounced and/or the signal strength is set low when the accuracy of the determined relative position is high, and/or the directional characteristic is weakly pronounced and/or the signal strength is set high when the accuracy of the determined relative position is low. The more precisely the relative position of the external base station is known, the more pronounced the directional characteristic of the radio signal can be set without the wireless communication with the external radio station being interrupted. By way of a non-limiting example, the radio signal is aligned as precisely as possible to the external radio station. Conversely, if the relative position of the external base station is not known or is only known imprecisely, the radio signal must be emitted isotropically or approximately isotropically in order to ensure wireless communication with the external radio station. The more pronounced the directional characteristic of the multiple antennas is set, the more the signal strength of the radio signal and thus the transmission power of the antennas can be reduced.

The signal strength of the emitted, directed radio signal required for wireless communication with the external radio station depends on the distance between the external radio station and the vehicle. The more precisely the distance is known, the lower the signal strength of the emitted radio signal can be set, since no large safety reserve has to be provided for the emitted radio signal in order to ensure wireless communication with the external radio station. In other words, a small safety margin is sufficient for the emitted radio signal to reach the external radio station with a high level of security.

As a result, a radio signal with the lowest possible signal strength is emitted in the smallest possible solid angle range, which is associated with a low power consumption of the multiple antennas and a high efficiency of wireless communication.

In some embodiments, a relative position of the external radio station is continuously determined while traveling and/or the directional characteristic and/or the signal strength is continuously set. While the vehicle is traveling, the relative position of the external radio station changes continuously as the vehicle moves relative to the external radio station. By continuously adjusting the directional characteristic and/or the signal strength of the emitted radio signal, the energy consumption of the vehicle for wireless communication is further reduced, which further increases the degree of efficiency of the vehicle.

In some embodiments, in order to determine the relative position of the external radio station, a relative position of the external radio station is estimated with an accuracy, the relative position of the external radio station is detected by measuring and the estimated relative position is updated by means of the detected relative position, and/or the accuracy of the estimated relative position is increased using the detected relative position. The relative position of the external radio station is first approximated by estimating. For example, estimating can be based on a position and orientation of the vehicle and a position of the external radio station. The current position and orientation of the vehicle can be determined, for example, using global positioning system (GPS), albeit very imprecisely. The absolute position of the external radio station can be taken from a digital map or transmitted from the radio station itself. If the performance of the external radio station is known, the relative position thereof can also be detected from a directional characteristic and a signal strength of a radio signal from the external radio station received from the vehicle. The detected relative position of the external radio station is used in order to update the estimated relative position of the external radio station or in order to increase the accuracy of the estimated relative position.

In some embodiments, a sensor system of the vehicle continuously supplies movement data of the vehicle, a controller calculates a movement of the vehicle from the movement data supplied and the controller updates the updated and/or refined estimated relative position continuously in accordance with the calculated movement of the vehicle. In this way, the relative position of the external radio station is continuously updated while the vehicle is traveling. This further increases the accuracy of the relative position of the external radio station.

In some embodiments, a direction of arrival (DoA) algorithm, an angle of arrival (AoA) algorithm, a coordinate transformation, a Kalman filter, a nonlinear extension of a Kalman filter, a particle filter, a Bayesian network, a Markov network, and/or a neural network is/are used. The direction of arrival algorithm and the angle of arrival algorithm are used to calculate the relative position of the external radio station on the basis of detected measured values. Coordinate transformations can be carried out between any coordinate systems as required. Geographic coordinates, Cartesian coordinates, polar coordinates, cylinder coordinates, and spherical coordinates are coordinates of exemplary coordinate systems. The Kalman filter or its non-linear extension and the particle filter are each used to smooth measurement curves, i.e. the calculation of measured outliers. The Bayesian network and the Markov network are instruments for determining a probabilistic (accuracy, confidence), for which a neural network (artificial intelligence, AI) can also be used.

In some embodiments, after the interruption of the communication between the vehicle and the external radio station, the steps of estimating, of detecting, of updating, and of increasing are repeated and/or a boundary of the radio cell is determined and, after the vehicle exits the radio cell and after the vehicle enters an adjacent radio cell, the steps of estimating, detecting, updating, and increasing in relation to an external radio station of the adjacent radio cell are carried out. Interrupting the wireless communication with the external radio station of the current radio cell as well as changing the radio cell and thus the relevant external radio station require a reinitialization of the method according to the invention.

The boundary of the radio cell can be determined, for example, on the basis of a signal strength of a radio signal which was emitted by the external radio station. By way of a non-limiting example, the boundary can also be recognized by the fact that radio signals from an external radio station in an adjacent radio cell are also received.

In some embodiments, after entering the adjacent radio cell, the estimated relative position of the external radio station of the earlier radio cell is continuously updated in accordance with the calculated movement of the vehicle. This is useful while the vehicle is traveling along a radio station boundary and the vehicle is arranged multiple times between two adjacent radio station boundaries. By updating the relative positions of both external radio stations, a reinitialization of the method is dispensed with, which further increases the efficiency of the method and consequently the degree of efficiency of the vehicle.

In some embodiments, a transmission power of each antenna of the plurality of antennas is calculated suitably depending on an arrangement of the plurality of antennas and the signal strength to be set, and/or the directional characteristic to be set, and each antenna is controlled in accordance with the calculated transmission power. The arrangement of the multiple antennas determines the transmission power to be generated for each antenna in order to set a required signal strength and/or directional characteristic. The transmission power of each antenna is calculated by the controller.

The subject matter of the present disclosure is also a vehicle with a plurality of antennas and a controller that is operatively connected to the antennas. Such vehicles are widespread, so that the present disclosure can be used in many ways.

In the vehicle according to some embodiments, the controller is configured to operate the multiple antennas in a method according to the invention. In accordance with a corresponding configuration, a controller present in the vehicle is suitable for reducing the power consumption of the plurality of antennas. The method, according to some embodiments, can therefore also be implemented cost-effectively in the vehicle at a later date.

A substantial advantage of the method according to various embodiments described herein is that an average transmission power of the multiple antennas is low. Accordingly, the vehicle requires little energy for wireless communication, which is associated with a high degree of efficiency of the vehicle and an increased range as well as low $CO_2$ emissions from the vehicle. In addition, the method according to various embodiments described herein counteracts increasing electrosmog caused by vehicles. Another advantage of the method according to various embodiments described herein is that an existing controller of the vehicle can be configured subsequently to carry out the method, as described herein in accordance with some embodiments.

FIG. 1 shows a schematic representation of a top view of an embodiment of the vehicle 10. The vehicle 10 includes a plurality of antennas 11, which are arranged spaced apart from one another, and a controller 12 which is operatively connected to the antennas 11. The controller 12 is configured to operate the plurality of antennas 11 in the method 100 described below. Furthermore, the vehicle 10 includes a conventional sensor system (not shown) for detecting a movement of the vehicle 10 while traveling.

During operation of the vehicle 10, the vehicle 10 travels through radio cells 21, 31 of external radio stations 20, 30 and communicates wirelessly with the respective external radio station 20, 30 via a radio signal 40, which is emitted by the multiple antennas 11. The radio cell 21 has a boundary 22 at which the vehicle 10 leaves the radio cell 21 and enters the adjacent radio cell 31.

Figure 2:
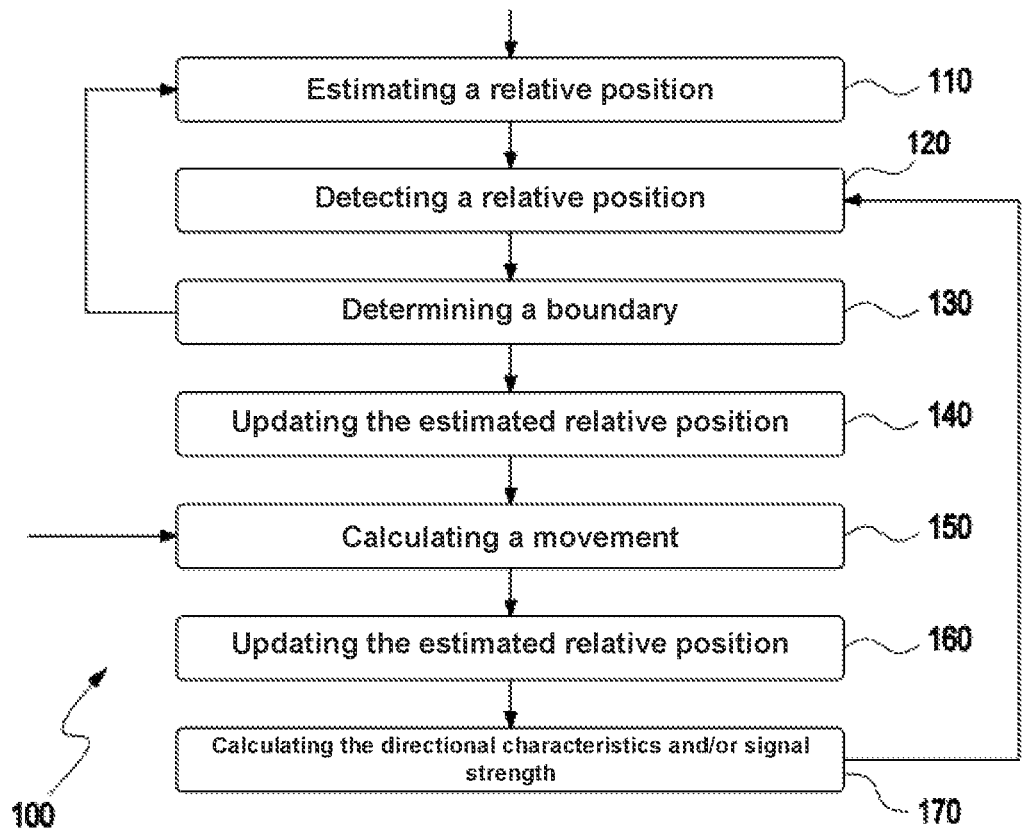
FIG. 2 is a schematic representation of a flow diagram of an embodiment of the method according to some embodiments.

FIG. 2 shows, in a schematic representation, a flow diagram of an embodiment of the method 100 for operating the plurality of antennas 11 of the vehicle 10. In the method, a signal strength 41 (see FIG. 4) and/or a directional characteristic 42 (see FIG. 3) of the emitted radio signal 40 is set depending on a determined relative position and an accuracy of a determined relative position of the external radio station 20, 30. For this purpose, the relative position of the external radio station 20, 30 is continuously determined while traveling and the directional characteristic 42 and the signal strength 41 are each set in accordance with the determined relative position of the external radio station 20, 30 and with the accuracy of the determined relative position.

In accordance with some embodiments, the directional characteristic 42 is strongly pronounced and the signal strength 41 is set low when the accuracy of the determined relative position is high, and the directional characteristic 42 is weakly pronounced and the signal strength 41 is set high when the accuracy (confidence) of the determined relative position is low.

In order to determine the relative position of the external radio station 20, 30, a relative position of the external radio station 20, 30 is estimated 110 with an accuracy in an initialization step. The relative position of the external radio station 20, 30 is then detected 120 by measuring and the estimated relative position is updated 140 using the detected relative position. In this way, the accuracy of the estimated relative position is increased by means of the detected relative position.

The sensor system of the vehicle 10 continuously supplies movement data of the vehicle 10, from which the controller 12 calculates 150 a movement of the vehicle 10. The estimated relative position updated and/or refined by increasing the accuracy is continuously updated 160 in a further step in accordance with the calculated movement of the vehicle 10.

In the above method steps, a direction of arrival (DoA) algorithm, an angle of arrival (AoA) algorithm, a coordinate transformation, a Kalman filter, a nonlinear extension of a Kalman filter, a particle filter, a Bayesian network, a Markov network, or a neural network is used as required. The algorithms, transformations, filters, and networks mentioned are not conclusively enumerated and can be used multiple times and in any combination within the method.

After the interruption of the communication of the vehicle 10 with the external radio station 20, 30, for example, if the vehicle 10 is arranged in a tunnel or in a radio shadow of the external radio station 20, 30, the steps of estimating 110, detecting 120, and updating 140, and increasing are repeated.

Furthermore, the boundary 22 of the radio cell 21 is determined 130 while traveling. Even after the vehicle 10 exits the radio cell 21 and after the vehicle 10 enters an adjacent radio cell 31, i.e. after passing the boundary 22, the steps of estimating 110, detecting 120, updating 140 and increasing in relation to the external radio station 30 of the adjacent radio cell 31 are carried out.

After entering the adjacent radio cell 31, the estimated relative position of the external radio station 20 of the earlier radio cell 21 is continuously updated 160 for a specific time in accordance with the calculated movement of the vehicle 10. As a result, a multiple initialization of the method can be dispensed with when the vehicle 10 changes multiple times between the adjacent radio cells 21, 31.

Figure 3:
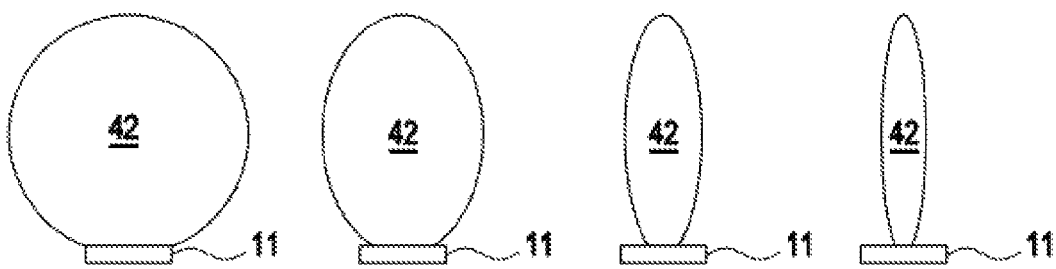
FIG. 3 is a schematic representation of various directional characteristics of the radio signal shown in FIG. 1 according to some embodiments.
Figure 4:
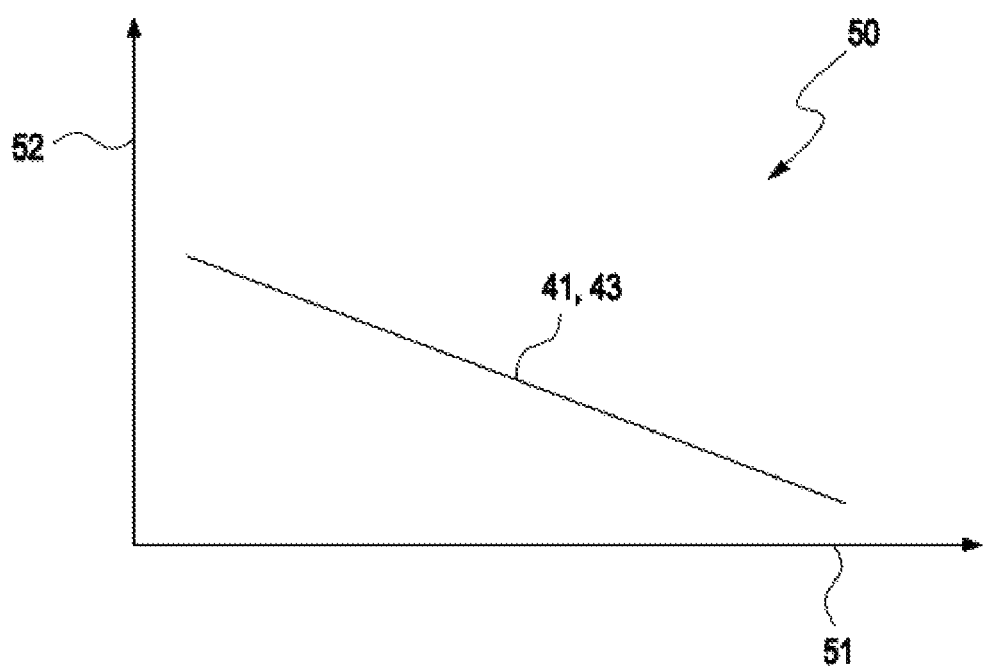
FIG. 4 is a function graph of a characteristic curve of a signal strength of the radio signal shown in FIG. 1 according to some embodiments.

A transmission power 43 (see FIG. 4) of each antenna 11 of the plurality of antennas 11 is calculated 170 depending on an arrangement of the plurality of antennas 11 and the signal strength 41 to be set and/or the directional characteristic 42 (see FIG. 3) to be set, and each antenna 11 is controlled in accordance with the calculated transmission power 43 (see FIG. 4).

FIG. 3 shows, in a schematic representation, various directional characteristics 42 of the radio signal 40 shown in FIG. 1. The strength of the pronounced form of the directional characteristics 42 increases from a) to b) and from c) to d). The weakly pronounced directional characteristic 42 shown in FIG. 3 a) is set during the initialization of the method. With increasing accuracy of the relative position of the external radio station 20, 30, depending on the accuracy achieved, more pronounced directional characteristics 42 are set step by step, as are shown in FIG. 3 b), c), and d).

In a function graph 50, FIG. 4 shows a characteristic curve of the signal strength 41 of the radio signal 40 shown in FIG. 1 which corresponds approximately to a characteristic curve of the transmission power 43. The time is plotted on the abscissa 51 of the function graph 50 and the signal strength 41 of the emitted radio signal 40 or the transmission power 43 of the multiple antennas 11 is plotted on the ordinate 52 of the function graph. The signal strength 41 of the emitted radio signal or the transmission power 43 of the multiple antennas 11 increases, starting from the initialization of the method 100 while the vehicle 10 is traveling in the radio cell 21, 31 with increasing duration of the method 100, in accordance with the increasing accuracy of the estimated relative position of the external radio station 20, 30.

LIST OF REFERENCE SIGNS

10 vehicle
11 antenna
12 controller
20 external radio station
21 radio cell
22 boundary
30 external radio station
31 radio cell
40 radio signal
41 signal strength
42 directional characteristic
43 transmission power
50 function graph
51 abscissa
52 ordinate
100 method
110 estimating a relative position
120 detecting the relative position
130 determining a boundary
140 updating the estimated relative position
150 calculating a movement
160 updating the estimated relative position
170 calculating a directional characteristic and/or signal strength

The invention claimed is:

1. A method for operating a plurality of antennas of a vehicle, the method comprising:
   estimating, by a controller of the vehicle, an estimated relative position of an external radio station;
   detecting, by a sensor system, a detected relative position of the external radio station;
   updating, by the controller, the estimated relative position with the detected relative position, to obtain a determined relative position of the external radio station;
   based on an accuracy of the determined relative position of the external radio station, determining, by the controller, a signal strength and a directional characteristic of a radio signal; and
   transmitting, by the controller, the radio signal wirelessly via the plurality of antennas to the external radio station while the vehicle is traveling through a radio cell of the external radio station.

2. The method of claim 1, further comprising:
   setting the directional characteristic of the radio signal more pronounced and/or the signal strength of the radio signal lower when the accuracy of the determined relative position of the external radio station is high; and
   setting the directional characteristic of the radio signal less pronounced and/or the signal strength of the radio signal higher when the accuracy of the determined relative position of the external radio station is low.

3. The method of claim 1, further comprising:
   determining a new relative position of the external radio station continuously while the vehicle is traveling; and
   setting the directional characteristic and the signal strength of the radio signal based on the new relative position of the external radio station.

4. The method of claim 1,
   wherein estimating the estimated relative position of the external radio station includes using a position and an orientation of the vehicle and a position of the external radio station, and
   wherein detecting the detected relative position includes using the directional characteristic and the signal strength of the radio signal.

5. The method of claim 4, further comprising calculating, by the controller, a movement of the vehicle a plurality of times while the vehicle is moving, wherein the movement is determined based on movement data of the vehicle supplied by a sensor system of the vehicle.

6. The method of claim 4, further comprising:
determining a boundary of the radio cell after detecting an interruption of communication between the vehicle and the external radio station; and
after the vehicle exits the radio cell of the external radio station or after the vehicle enters an adjacent radio cell of another external radio station, determining a relative position of the other external radio station for setting the signal strength and the directional characteristic of the radio signal for wirelessly communicating with the other external radio station.

7. The method of claim 6, further comprising updating the estimated relative position of the external radio station of the radio cell in accordance with a calculated movement of the vehicle after the vehicle enters the adjacent radio cell.

8. The method of claim 1, wherein the relative position of the external radio station is determined using one or more of a direction of arrival algorithm, an angle of arrival algorithm, a coordinate transformation, a Kalman filter, a non-linear extension of the Kalman filter, a particle filter, a Bayesian network, a Markov network, and/or a neural network.

9. The method of claim 1, further comprising:
calculating a transmission power of each antenna of the plurality of antennas depending on an arrangement of the plurality of antennas; and
setting the signal strength and the directional characteristic of the radio signal in accordance with the calculated transmission power.

10. A vehicle, comprising:
a plurality of antennas;
a sensor system configured to detect a detected relative position of the external radio station; and
a controller operatively connected to the plurality of antennas, wherein the controller is configured to:
estimate an estimated relative position of an external radio station;
update the estimated relative position with the detected relative position to obtain a determined relative position of the external radio station;
based on an accuracy of the determined relative position of the external radio station, determine a signal strength and a directional characteristic of a radio signal; and
transmit the radio signal wirelessly via the plurality of antennas to the external radio station while the vehicle is traveling through a radio cell of the external radio station.

11. The vehicle of claim 10, wherein the controller is further configured to:
setting the directional characteristic of the radio signal more pronounced and/or the signal strength of the radio signal lower when the accuracy of the determined relative position of the external radio station is high; and
setting the directional characteristic of the radio signal less pronounced and/or the signal strength of the radio signal higher when the accuracy of the determined relative position of the external radio station is low.

12. The vehicle of claim 10, wherein the controller is further configured to:
determine a new relative position of the external radio station continuously while the vehicle is traveling; and
set the directional characteristic and the signal strength of the radio signal based on the new relative position of the external radio station.

13. The vehicle of claim 10, wherein the controller is configured to determine the relative position of the external radio station by being configured to:
estimate the estimated relative position of the external radio station based on a position and an orientation of the vehicle and a position of the external radio station; and
detect the detected relative position from the directional characteristic and the signal strength of the radio signal from the external radio station.

14. The vehicle of claim 13, wherein the controller is further configured to:
determine a boundary of the radio cell after detecting an interruption of communication between the vehicle and the external radio station; and
after the vehicle exits the radio cell of the external radio station or after the vehicle enters an adjacent radio cell of another external radio station, determine a relative position of the other external radio station for setting the signal strength and the directional characteristic of the radio signal for wirelessly communicating with the other external radio station.

15. The vehicle of claim 14, wherein the controller is further configured to update the estimated relative position of the external radio station of the radio cell in accordance with a calculated movement of the vehicle after the vehicle enters the adjacent radio cell.

16. The vehicle of claim 13, wherein the controller is further configured to calculate a movement of the vehicle a plurality of times while the vehicle is moving, wherein the movement is determined based on movement data of the vehicle supplied by a sensor system of the vehicle.

17. The vehicle of claim 10, wherein the controller is further configured to determine the relative position of the external radio station by using one or more of a direction of arrival algorithm, an angle of arrival algorithm, a coordinate transformation, a Kalman filter, a non-linear extension of the Kalman filter, a particle filter, a Bayesian network, a Markov network, and/or a neural network.

18. The vehicle of claim 10, wherein the controller is further configured to:
calculate a transmission power of each antenna of the plurality of antennas depending on an arrangement of the plurality of antennas; and
set the signal strength and the directional characteristic of the radio signal in accordance with the calculated transmission power.

* * * * *